US012676073B2

(12) United States Patent
Kadavil

(10) Patent No.: US 12,676,073 B2
(45) Date of Patent: Jul. 7, 2026

(54) SYSTEMS AND METHODS FOR QUANTIFYING AIRPORT TAXIWAY CONGESTION

(71) Applicant: HONEYWELL INTERNATIONAL INC., Charlotte, NC (US)

(72) Inventor: Navin Zacharia Kadavil, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 314 days.

(21) Appl. No.: 18/359,438

(22) Filed: Jul. 26, 2023

(65) Prior Publication Data

US 2024/0420583 A1 Dec. 19, 2024

(30) Foreign Application Priority Data

Jun. 14, 2023 (IN) ............................. 202311040532

(51) Int. Cl.

| | |
|---|---|
| ***G08G 5/51*** | (2025.01) |
| ***G08G 5/21*** | (2025.01) |
| ***G08G 5/26*** | (2025.01) |
| ***G08G 5/72*** | (2025.01) |

(52) U.S. Cl.

CPC ................. *G08G 5/51* (2025.01); *G08G 5/21* (2025.01); *G08G 5/26* (2025.01); *G08G 5/727* (2025.01)

(58) Field of Classification Search

CPC ............ G08G 5/51; G08G 5/21; G08G 5/727; G08G 5/26

See application file for complete search history.

(56) References Cited

U.S. PATENT DOCUMENTS

| | | | | |
|---|---|---|---|---|
| 9,396,663 | B2 | 7/2016 | Zimmer et al. | |
| 10,685,574 | B2 | 6/2020 | White et al. | |
| 2010/0063716 | A1* | 3/2010 | Brozat ..................... | G08G 5/56 701/120 |
| 2010/0125403 | A1* | 5/2010 | Clark ....................... | G08G 5/51 701/120 |
| 2013/0131888 | A1* | 5/2013 | Nutaro ..................... | G08G 5/51 701/1 |
| 2018/0061243 | A1* | 3/2018 | Shloosh ................... | G08G 5/21 |
| 2019/0080622 | A1 | 3/2019 | Gros et al. | |
| 2022/0005364 | A1 | 1/2022 | Wang et al. | |
| 2023/0066629 | A1 | 3/2023 | Belamkonda et al. | |
| 2024/0311728 | A1* | 9/2024 | Hosamani .............. | G06Q 10/04 |

FOREIGN PATENT DOCUMENTS

| | | | | |
|---|---|---|---|---|
| CN | 114372630 | A | 4/2022 | |
| EP | 2355070 | A2 * | 8/2011 | ............... G08G 5/51 |
| EP | 3200171 | A1 * | 8/2017 | ............... G08G 5/51 |
| EP | 3933807 | A1 | 1/2022 | |
| JP | H09282600 | A | 10/1997 | |

* cited by examiner

*Primary Examiner* — Calvin Cheung

(74) *Attorney, Agent, or Firm* — Ingrassia Fisher & Lorenz LLP

(57) ABSTRACT

Systems and methods are provided for quantifying airport taxiway congestion. The systems include a database comprising airport data indicating runways of an airport and taxi edges of the airport, positions of aircraft at the airport, and taxi paths of aircraft at the airport, and one or more controllers configured to, by one or more processors, determine a number of aircraft instructed to proceed to a first of the taxi edges, and generate a congestion factor for the first taxi edge based, at least in part, on the number of aircraft proceeding to the first taxi edge.

20 Claims, 5 Drawing Sheets

SYSTEMS AND METHODS FOR QUANTIFYING AIRPORT TAXIWAY CONGESTION

CROSS REFERENCE TO RELATED APPLICATION

The present application claims benefit of prior filed India Provisional Patent Application No. 202311040532, filed Jun. 14, 2023, which is hereby incorporated by reference herein in its entirety.

TECHNICAL FIELD

The present invention generally relates to aircraft taxiing congestion at an airport, and more particularly relates to systems and methods for quantifying congestion of taxiways at an airport to promote efficient taxiing operations.

BACKGROUND

Air traffic control (ATC) at an airport has the authority to direct aircraft both on the ground and in the airspace surrounding the airport. The purpose of directing aircraft in these areas is to prevent collisions, manage and expedite air traffic, and provide pilots with necessary information and support. ATC may be required to direct multiple aircraft within and around the airport. For example, an ATC controller might need to direct a departing aircraft from a parking stand to a runway or direct an incoming aircraft from the runway to the parking stand. Depending on the size of the airport, the number of taxiing aircraft, and various other factors, it may be challenging to efficiently direct the aircraft along the taxiways.

Hence, there is an ongoing desire for systems and methods that promote efficient taxiing of aircraft at airports. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various examples, a method is provided that includes receiving airport data including runways of an airport, taxi edges of the airport, positions of aircraft at the airport, and taxi paths of aircraft at the airport; determining, by one or more processors, a number of aircraft instructed to proceed to a first of the taxi edges, and generating, by the one or more processors, a congestion factor for the first taxi edge based, at least in part, on the number of aircraft proceeding to the first taxi edge.

In various examples, a system is provided that includes a database comprising airport data indicating runways of an airport and taxi edges of the airport, positions of aircraft at the airport, and taxi paths of aircraft at the airport, and one or more controllers configured to, by one or more processors, determine a number of aircraft instructed to proceed to a first of the taxi edges, and generate a congestion factor for the first taxi edge based, at least in part, on the number of aircraft proceeding to the first taxi edge.

Furthermore, other desirable features and characteristics of the system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
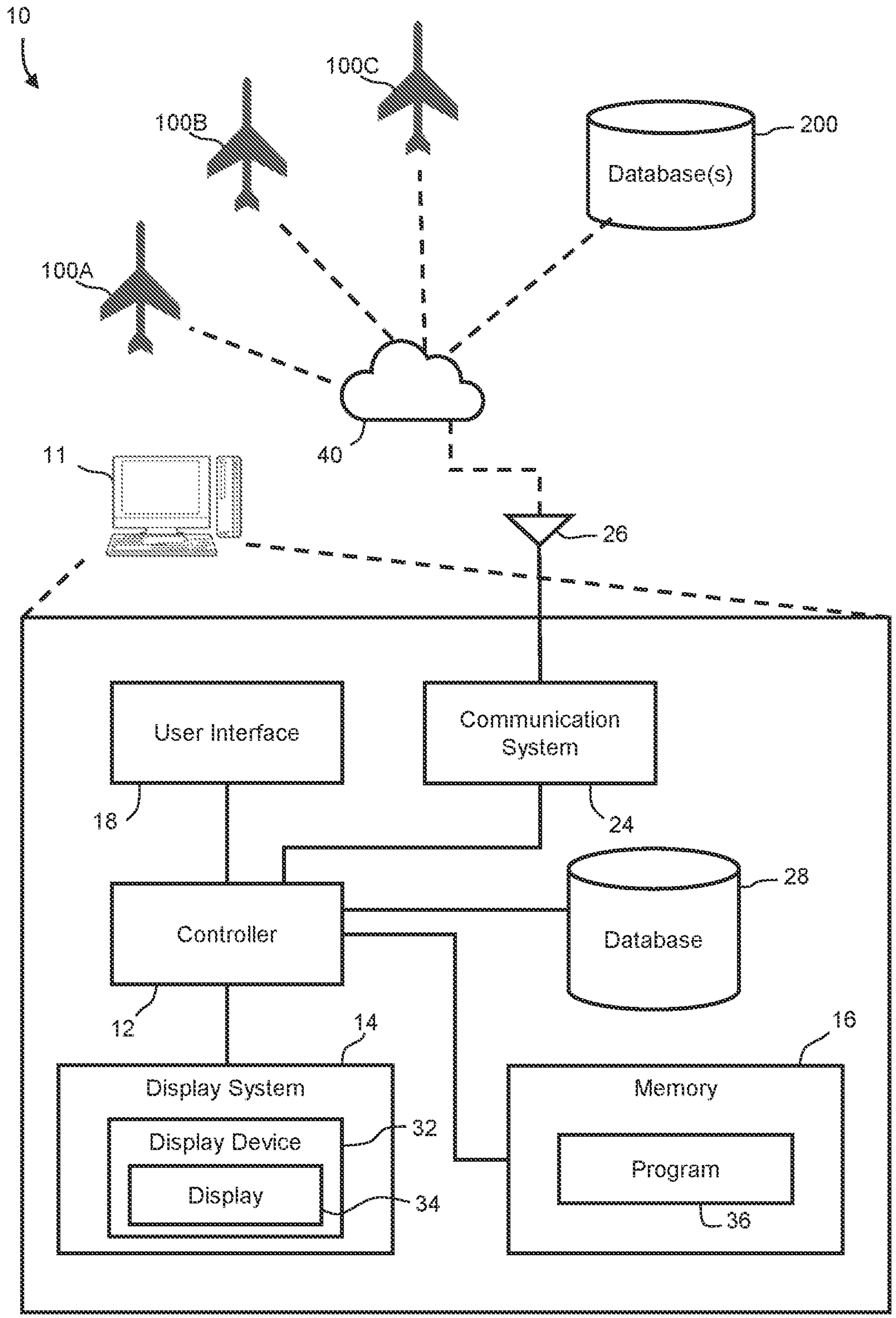
FIGS. 1 and 2 schematically represent an airport congestion system that provides for communication between multiple aircraft and a taxi traffic management system in accordance with an implementation of the disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for monitoring aircraft taxi traffic congestion at an airport and promoting awareness of such congestion to airport traffic managers, aircraft crews, and other parties. In particular, the systems and methods may use pre-existing taxi edges of the airport, and determine and quantify congestion associated with some or all of the taxi edges. In this manner, the systems and methods provide for quantifying the aircraft taxi traffic congestion within the airport such that the congestion is easily accessed and used for airport taxi traffic management.

As used herein, a taxi edge refers to a taxiway, typically identified by alphanumerical identifiers (e.g., A, BB, C1, C2, etc.) or a section of a taxiway on an airport diagram and markings and/or signs at the airport. Taxi edges allow air traffic controllers, airport management, flight crews, and other parties to efficiently communicate locations and routes associated with the airport. For example, an air traffic controller may communicate a taxi path defined by a sequence of taxi edges to a pilot of an aircraft to indicate a route for the aircraft to travel, for example, while taxiing between a parking stand and a runway.

In various examples, the systems and methods include providing quantified information relating to the taxi congestion at the airport to airport traffic managers, air traffic controllers, and other personnel to promote ease of efficiently managing taxiing of aircraft at the airport. In various examples, the systems and methods include providing quantified information relating to the taxi congestion at the airport to flight crews of the aircraft at the airport to promote taxiing time and/or delay information.

It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc. For convenience, the systems and methods will be described in reference to multiple manned or human controlled aircraft; however, as noted the systems and methods are not limited to such application.

Figure 2:
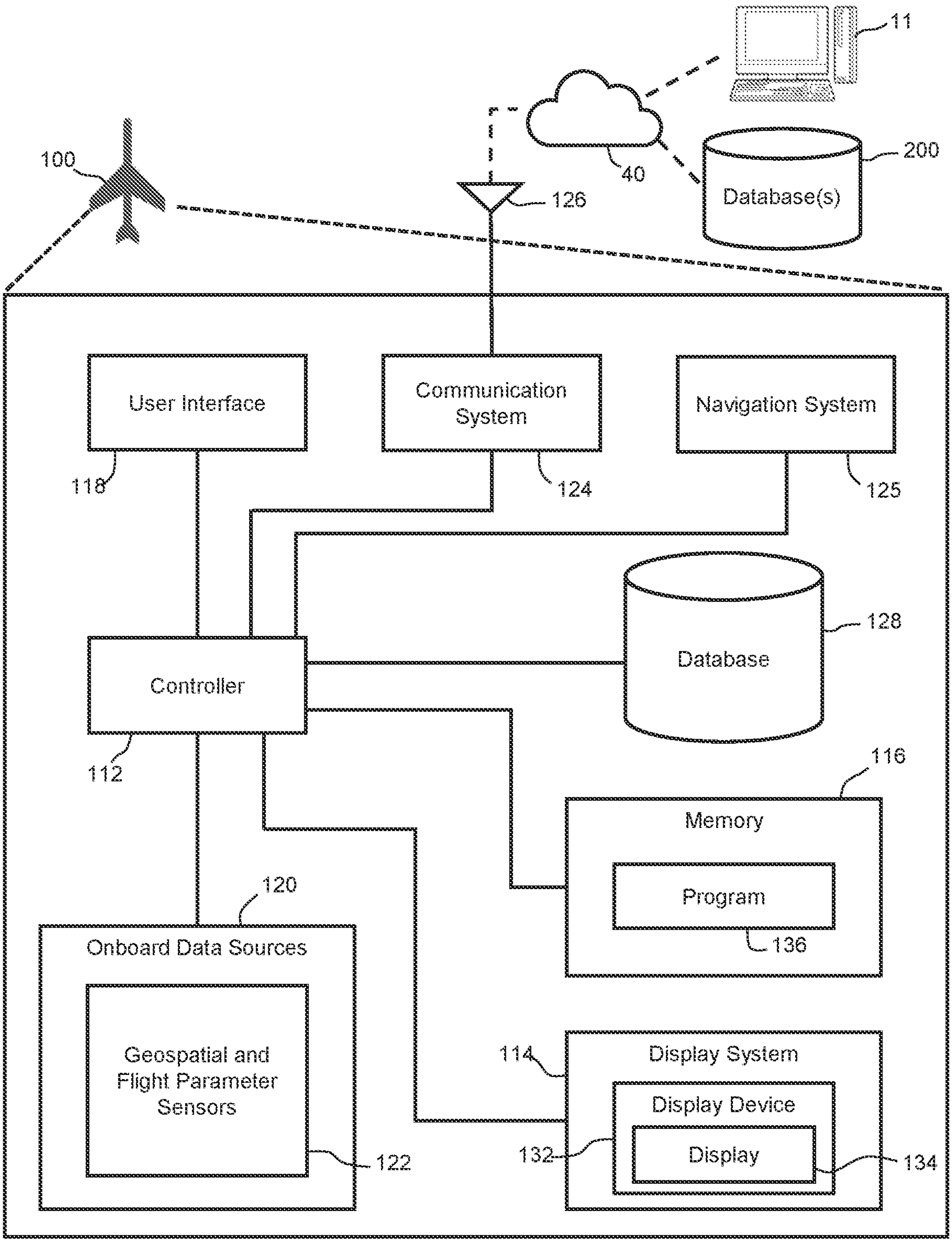

Referring now to FIGS. 1 and 2, an airport congestion system 10 and certain systems thereof are illustrated in accordance with an exemplary and nonlimiting implementation of the present disclosure. The airport congestion system 10 includes a taxi traffic management system 11, multiple aircraft 100 (in this example, three aircraft 100A, 100B, and 100C), and one or more databases 200 in communication via a network 40. FIG. 1 presents certain components of the taxi traffic management system 11 and FIG. 2 presents certain components of the aircraft 100.

As schematically depicted in FIG. 1, the taxi traffic management system 11 includes and/or is functionally coupled to the following components or subsystems, each of which may assume the form of a single device or multiple interconnected devices, including, but not limited to, a controller 12 operationally coupled to: at least one display device 32, which may optionally be part of a larger display system 14; computer-readable storage media or memory 16; a user interface 18, a communication system 24, and, optionally, one or more databases 28. The communication system 24 includes an antenna 26, which may wirelessly transmit data to and receive data from various external sources physically and/or geographically remote to the taxi traffic management system 11 (e.g., to the aircraft 100 at the airport).

As schematically depicted in FIG. 2, each aircraft 100 includes and/or is functionally coupled to the following components or subsystems, each of which may assume the form of a single device or multiple interconnected devices, including, but not limited to, a controller 112 operationally coupled to: at least one display device 132, which may optionally be part of a larger on-board display system 114; computer-readable storage media or memory 116; a user interface 118, onboard data sources 120 including, for example, an array of geospatial and flight parameter sensors 122, a communication system 124, a navigation system 125, and, optionally, one or more databases 128. The communication system 124 includes an antenna 126, which may wirelessly transmit data to and receive data from various external sources physically and/or geographically remote to the aircraft 100 (e.g., to the taxi traffic management system 11).

Although schematically illustrated in FIGS. 1 and 2 as single units, the individual elements and components of taxi traffic management system 11 and the aircraft 100 can be implemented in a distributed manner utilizing any practical number of physically distinct and operatively interconnected pieces of hardware or equipment.

The term "controller," as appearing herein, broadly encompasses those components utilized to carry-out or otherwise support the processing functionalities of the airport congestion system 10. Accordingly, the controllers 12 and 112 can each encompass or may be associated with any number of individual processors, flight control computers, navigational equipment pieces, computer-readable memories (including or in addition to the memory 16 and 116), power supplies, storage devices, interface cards, and other standardized components.

In various embodiments, the controllers 12 and 112 each include at least one processor, a communication bus, and a computer readable storage device or media. The processor performs the computation and control functions of the respective controller 12/112. The processor can be any custom made or commercially available processor, a central processing unit (CPU), a graphics processing unit (GPU), an auxiliary processor among several processors associated with the controller 12/112, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12/112. The bus serves to transmit programs, data, status and other information or signals between the various components of the taxi traffic management system 11 or the aircraft 100. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals, perform logic, calculations, methods and/or algorithms, and generate data based on the logic, calculations, methods, and/or algorithms. Although only one controller 12 is shown in FIG. 1 and one controller 112 in FIG. 2, embodiments of the taxi traffic management system 11 and the aircraft 100 can include any number of controllers 12/112 that communicate over any suitable communication medium or a combination of communication mediums and that cooperate to process the sensor signals, perform logic, calculations, methods, and/or algorithms, and generate data. In various embodiments, the controllers 12 and/or 112 includes or cooperates with at least one firmware and software program (generally, computer-readable instructions that embody an algorithm) for carrying-out the various process tasks, calculations, and control/display functions described herein. During operation, the controller 12/112 may be programmed with and execute at least one firmware or software program, for example, a program 36/136, that embodies one or more algorithms, to thereby perform the various process steps, tasks, calculations, and control/display functions described herein.

The controllers 12 and 112 may exchange data with one or more external sources to support operation of the airport congestion system 10 in various embodiments. In this case, bidirectional wireless data exchange may occur via the communication systems 24 and 124 over the network 40, such as a radio communications network capable of half-duplex operation. In various embodiments, the communication systems 24 and 124 may incorporate other types of systems such as a public or private network implemented in accordance with Transmission Control Protocol/Internet Protocol architectures or other conventional protocol standards. Encryption and mutual authentication techniques may be applied, as appropriate, to ensure data security.

In various embodiments, the communication systems 24 and 124 are each configured to support instantaneous (i.e., real time or current) communications between on-board systems, the controller 12/112, and the one or more external sources. The communication systems 24 and 124 may each incorporate one or more transmitters, receivers, and the supporting communications hardware and software required for components of the airport congestion system 10 to communicate as described herein. In various embodiments, the communication systems 24 and/or 124 may have additional communications not directly relied upon herein, such as bidirectional pilot-to-ATC (air traffic control) communications via a datalink, and any other suitable radio communication system that supports communications between the taxi traffic management system 11, the aircraft 100, and various external source(s).

The memories 16 and 116 can each encompass any number and type of storage media suitable for storing computer-readable code or instructions, such as the program 36/136, as well as other data generally supporting the operation of the airport congestion system 10. As can be appreciated, the memories 16 and 116 may be part of the respective controller 12 or 112, separate from the respective controller 12 or 112, or part of the respective controller 12 or 112 and part of a separate system. The memories 16 and 116 can each be any suitable type of storage apparatus, including various different types of direct access storage and/or other memory devices.

A source of information suitable for operating one or more systems of the taxi traffic management system 11 and the aircraft 100 may be part of the airport congestion system 10. In certain embodiments, the source is one or more local databases 28/128 and/or one or more remote databases 200 employed to receive and store data, which may be updated on a periodic or iterative basis to ensure data timeliness. In various embodiments, the data may include various airport related information such as locations and identifiers for runways, taxiways, parking stands, aprons, etc., and may be stored in the memory 16/116 or in the one or more databases 28/128/200, and referenced by the program 36/136. In various embodiments, these databases 28/128/200 may be available online and accessible remotely by a suitable wireless communication system, such as the communication system 24/124.

With continued reference to FIGS. 1 and 2, the display devices 32 and 132 can each include any number and type of image generating devices on which one or more displays 34 and 134, respectively, may be produced. At least one display 34 and 134 is generated on each of the display devices 32 and 132, respectively, during operation of the airport congestion system 10. The airport congestion system 10 can generate various types of lateral and vertical avionic displays 34/134 on which symbology, text annunciations, and other graphics pertaining to flight planning are presented for an operator and/or a pilot to view. The display devices 32 and 132 are configured to continuously render at least one display 34 or 134 showing a common graphical display.

In various embodiments, the display device 132 may be affixed to the static structure of the aircraft 100 cockpit as, for example, a Head Down Display (HDD) or Head Up Display (HUD) unit. Alternatively, the display device 32 may assume the form of a movable display device (e.g., a pilot-worn display device) or a portable display device, such as an Electronic Flight Bag (EFB), a laptop, or a tablet computer carried into the aircraft 100 cockpit by a pilot. The display 134 generated and controlled by the airport congestion system 10 can include alphanumerical input displays of the type commonly presented on the screens of multi-function control and display units (MCDUs), as well as Control Display Units (CDUs) generally. Specifically, certain embodiments of the display 134 include one or more two-dimensional (2D) avionic displays, such as a horizontal (i.e., lateral) navigation display or vertical navigation display; and/or on one or more three-dimensional (3D) avionic displays, such as a Primary Flight Display (PFD) or an exocentric 3D avionic display.

In various embodiments, a human-machine interface, such as a touch screen display, is implemented as an integration of each of the user interfaces 18 and 118 and the display devices 32 and 132. Via various display and graphics systems processes, the controllers 12 and 112 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

Referring to FIG. 2, the sensors 122 supply various types of data and/or measurements to the controller 112. In various embodiments, the sensors 122 supply, without limitation, one or more of: inertial reference system measurements providing a location, Flight Path Angle (FPA) measurements, airspeed data, groundspeed data, vertical speed data, vertical acceleration data, altitude data, attitude data including pitch and roll measurements, yaw data, data related to ownship weight, time/date information, heading information, data related to atmospheric conditions, flight path data, flight track data, radar altitude data, geometric altitude data, wind speed and direction data. Further, in certain embodiments of the airport congestion system 10, the controller 112, and the other components of the airport congestion system 10 may be included within or cooperate with any number and type of systems commonly deployed onboard aircraft including, for example, an FMS, an Attitude Heading Reference System (AHRS), an Instrument Landing System (ILS), and/or an Inertial Reference System (IRS).

The navigation system 125 can provide navigation data associated with the aircraft's current position and flight direction (e.g., heading, course, track, etc.) to the controller 112. As such, the navigation system 125 can include, for example, an inertial navigation system, a satellite navigation system (e.g., Global Positioning System) receiver, VLF/OMEGA, Loran C, VOR/DME, DME/DME, IRS, aircraft attitude sensors, or the navigation information can come from a flight management system. The navigation data provided to the controller 112 can also include information about the aircraft's airspeed, ground speed, altitude (e.g., relative to sea level), pitch, and other important flight information. In any event, for this example embodiment, the navigation system 125 can include any suitable position and direction determination devices that are capable of providing the controller 112 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.).

Figure 3:
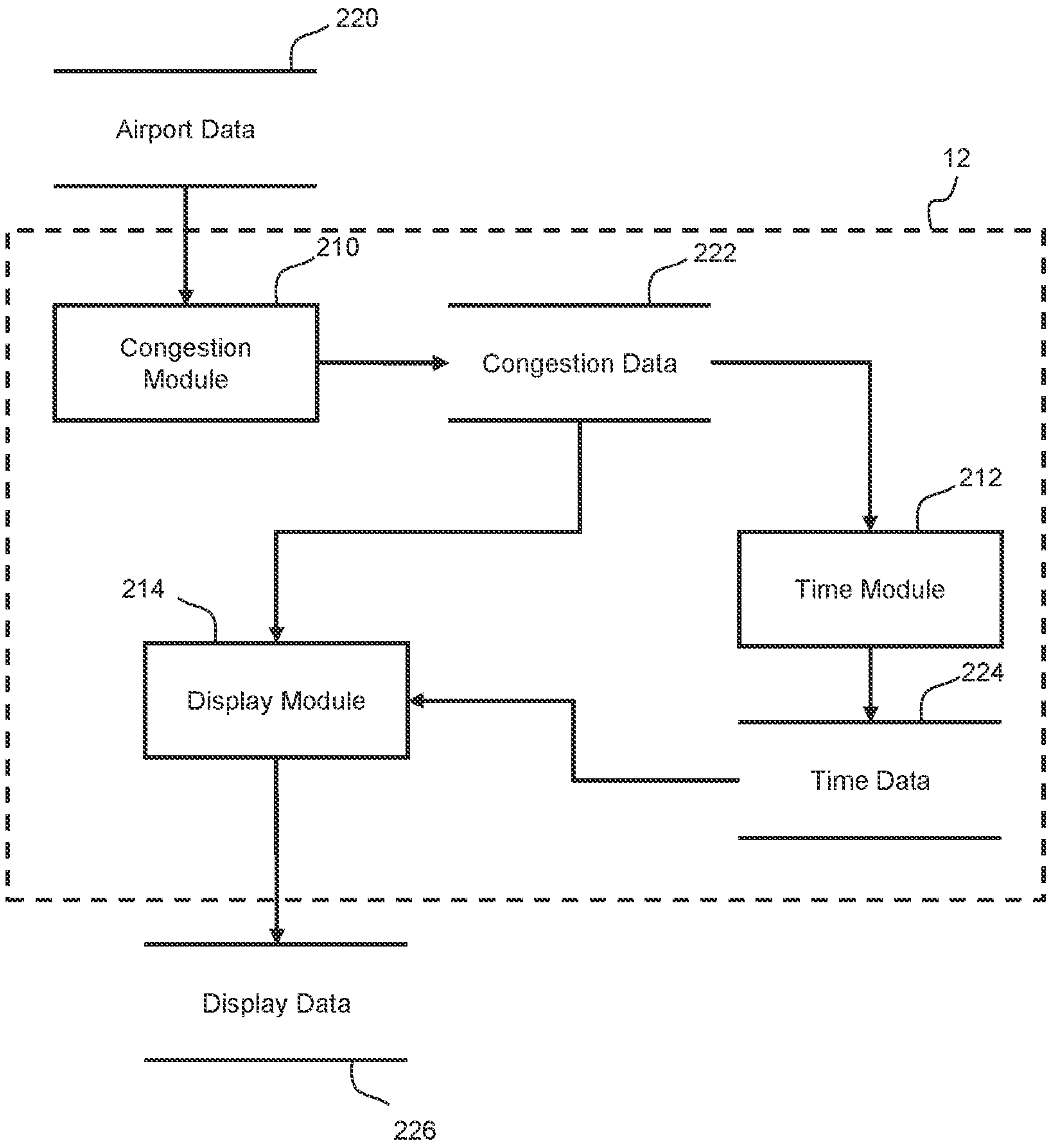
FIG. 3 is a dataflow diagram illustrating operation of the airport congestion system of FIGS. 1 and 2 in accordance with an implementation of the disclosure.

With reference to FIG. 3 and with continued reference to FIGS. 1-2, a dataflow diagram illustrates elements of the airport congestion system 10 of FIGS. 1-2 in accordance with various examples. As can be appreciated, various implementations of the airport congestion system 10 according to the present disclosure may include any number of modules embedded within the controller 12 which may be combined and/or further partitioned to similar systems and methods described herein. Furthermore, inputs to the airport congestion system 10 may be received from other control modules (not shown) associated with the taxi traffic management system 11 and/or determined/modeled by other sub-modules (not shown) within the controller 12. Furthermore, the inputs might also be subjected to preprocessing, such as sub-sampling, noise-reduction, normalization, feature-extraction, missing data reduction, and the like. In various embodiments, the airport congestion system 10 includes a congestion module 210, a time module 212, and a display module 214.

In various examples, the congestion module 210 receives as input airport data 220 generated by the aircraft 100 and/or retrieved from one or more databases (e.g., databases 28 and/or 200). The airport data 220 includes various data indicating locations and identifiers of runways of the airport, locations and identifiers of taxi edges of the airport, positions of the aircraft 100 at the airport, and taxi paths of the aircraft 100 at the airport. The congestion module 210 processes the airport data to determine a number of aircraft intending to proceed, cleared to proceed, or otherwise proceeding to each of the taxi edges. Based on the number of aircraft proceeding to each of the taxi edges, the congestion module 210 generates congestion factors for each of the taxi edges. The congestion module 210 generates congestion data 222 that includes various data indicating the congestion factors for some or all of the taxi edges of the airport.

In various examples, the time module 212 receives as input the congestion data 222 generated by congestion module 210. The time module 212 may determine various timing parameters relating to the taxiing of the aircraft 100 such as, but not limited to, determining a time delay for each of the taxi edges based on the congestion factor corresponding thereto, determining a cumulative time for each of the aircraft 100 based on the time delays of the taxi edges along corresponding taxi paths of the each of the aircraft 100 between a current position thereof and a runway entry point of the corresponding taxi path thereof, and/or determining an average time delay for each of the aircraft 100 based on the congestion factor of the taxi edge toward which the aircraft 100 are proceeding. In some examples, the average time delay is based, at least in part, on the number of aircraft instructed to proceed to the taxi edge and the length of the taxi edge. The time module 212 generates time data 224 that includes various data indicating the timing parameters of the taxi edges and/or of the aircraft 100.

In various examples, the display module 214 receives as input the congestion data 222 generated by the congestion module 210 and the time data 224 generated by the time module 212. The display module 214 generates display data 226 that includes various data configured to render or cause rendering of one or more of the congestion factors for each of the taxi edges and/or one or more of the timing parameters of the display 34 of the taxi traffic management system 11 and/or one or more of the displays 134 of the aircraft 100. The display module 214 may transmit the display data 226 to the display systems 14 and/or 114.

Figure 4:
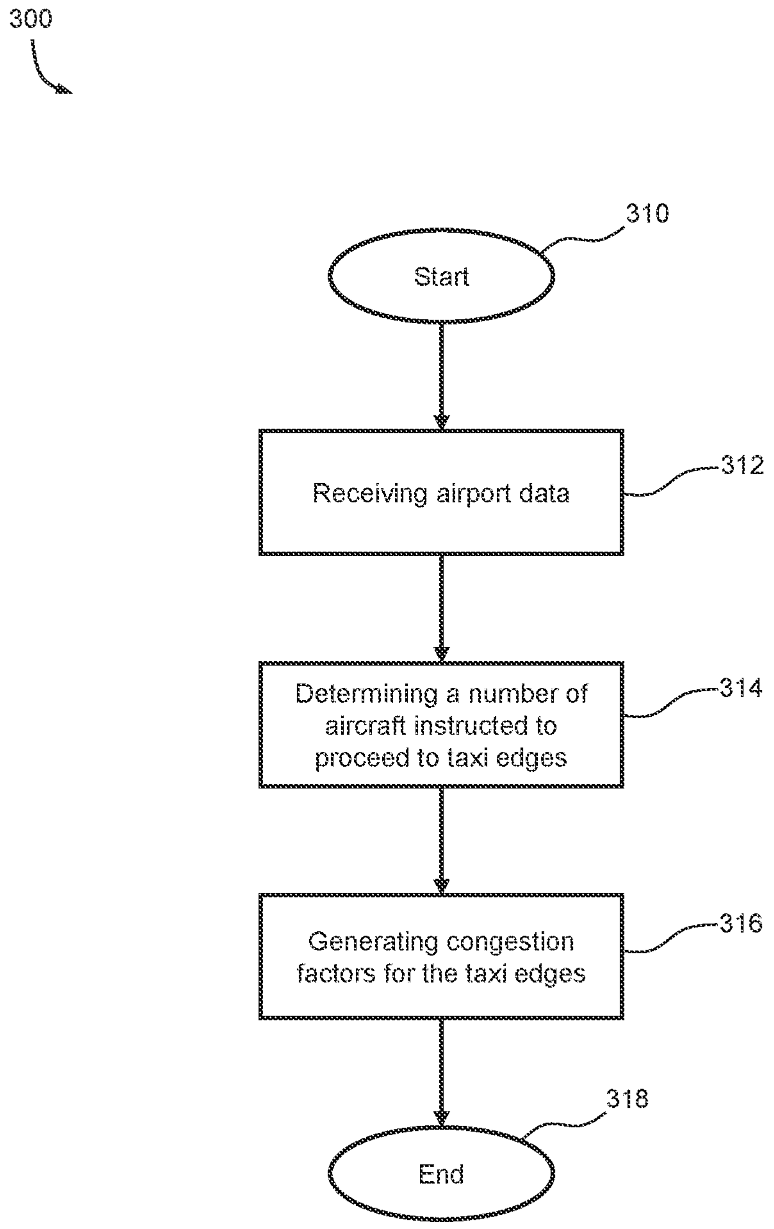
FIG. 4 is a flowchart illustrating an exemplary method for determining congestion associated with taxi edges of an airport in accordance with an implementation of the disclosure.

The systems disclosed herein, including the airport congestion system 10, provide for methods of monitoring and/or mitigating aircraft taxi congestion at an airport. For example, FIG. 4 is a flowchart illustrating an exemplary method 300 for quantifying airport congestion. For convenience, certain aspects of the method 300 will be discussed herein in reference to an exemplary airport 400 presented in FIG. 5. However, the method 300 is not limited to the airport 400 and is applicable to various airports having different structures.

The airport 400 includes a runway 410, intersection taxiways 412-420 connecting the runway 410 to a first parallel taxiway 432, intersection taxiways 422-430 connecting the first parallel taxiway 432 to a second parallel taxiway 434, and a taxiway 436 connecting the second parallel taxiway 434 to an apron 438. A building 440 includes the taxi traffic management system 11. First, second, and third aircraft 100A, 100B, and 100C are presented that are all instructed to proceed to the intersection taxiway 412 for departure via the runway 410. The first aircraft 100A is stopped at a runway holding position on the intersection taxiway 412, the second aircraft 100B is stopped at an intermediate holding area on the first parallel taxiway 432, and the third aircraft 100C is taxiing on the intersection taxiway 424.

The method 300 may start at 310. At 312, the method 300 may include receiving airport data including runways of the airport (e.g., the runway 410), taxi edges of the airport (e.g., taxiways 412-436), other airport features (e.g., the apron 438), taxi paths of aircraft at the airport, and positions of aircraft at the airport. At 314, the method 300 may include determining a number of aircraft instructed to proceed to each of the taxi edges. For example, in FIG. 5 the method 300 may determine that three aircraft (i.e., aircraft 100A, 100B, 100C) are instructed to proceed to the intersection taxiway 412, two aircraft (i.e., aircraft 100B, 100C) are instructed to proceed to the parallel taxiway 432, one aircraft (i.e., aircraft 100C) is instructed to proceed to the intersection taxiway 424, and zero aircraft are instructed to proceed to the other taxiways 414-422, 426-430, and 436. At 316, the method 300 may include generating a congestion factor for each of the taxi edges based, at least in part, on the number of aircraft proceeding to each of the taxi edges. In some examples generation of the congestion factor may be performed using, for example, an A* algorithm. The method 300 may end at 318. In various examples, the method 300 may be performed to generate congestion factors for some or all of the taxi edges, and the congestion factors may each be continuously updated in response to the number of aircraft instructed to proceed to the corresponding the taxi edges changing.

Figure 5:
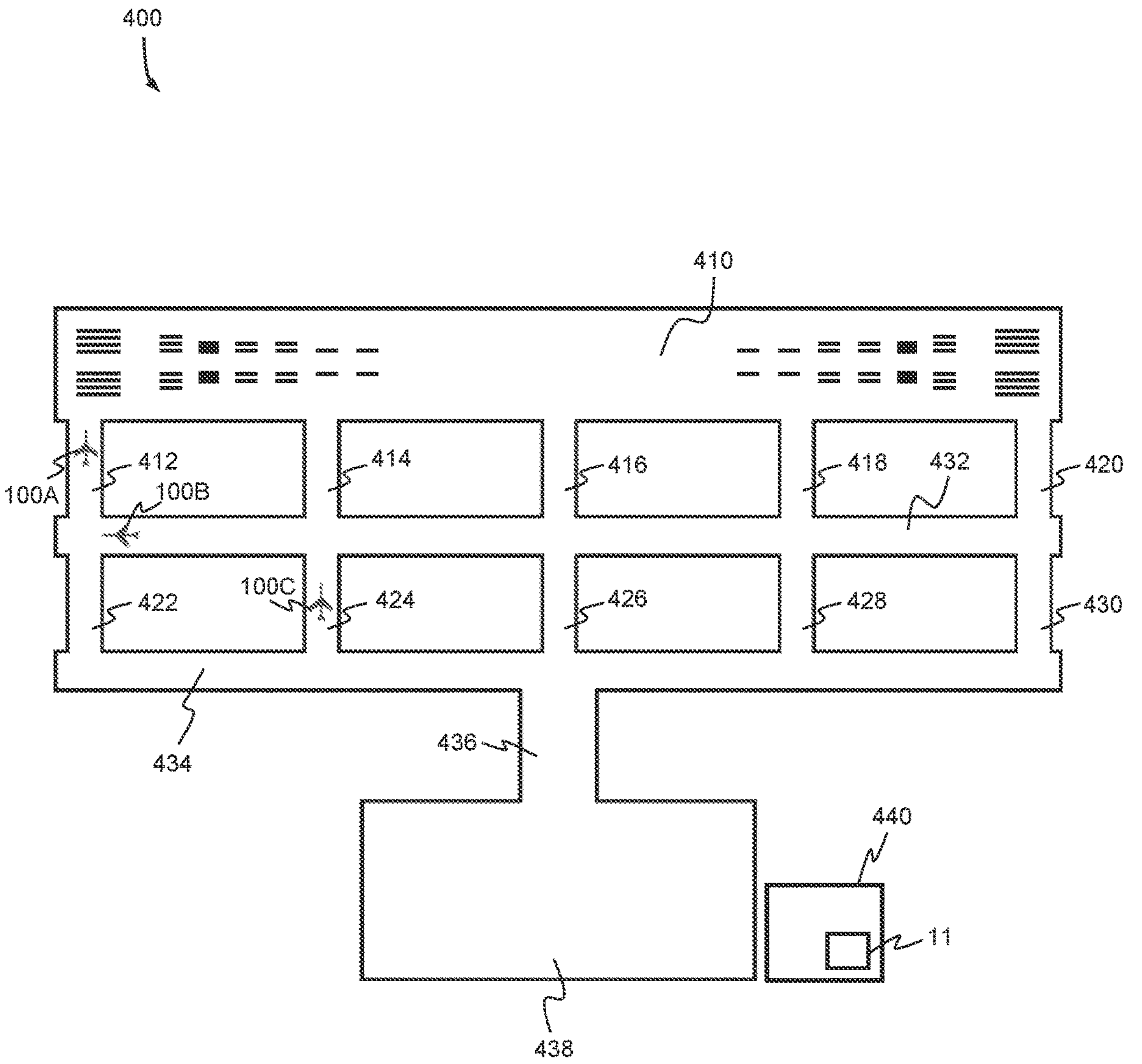
FIG. 5 schematically represents an exemplary airport and illustrates various aspects of the method of FIG. 4.

In various examples, the method 300 may include determining various time parameters relating to, for example, the congestion of the airport, the congestion of the taxi edges, and/or the taxiing times and/or delays of some or all of the aircraft at the airport. In various examples, the method 300 may include determining a time delay for each of the taxi edges based on the congestion factor corresponding to each of the taxi edges. With this information, each of the aircraft may be provided with a cumulative time specific to each aircraft based on the time delays of the taxi edges. For example, for a specific aircraft intending to depart, all of the time delays of the taxi edges along a taxi path of the aircraft between a current position thereof and a runway entry point assigned to the aircraft. In the example of FIG. 5, the cumulative time for the third aircraft 100C may be the sum total of the time delays for the taxiways 412, 424, and 432. The cumulative times for each of the aircraft may be provided and displayed on display devices (e.g., the display deice 132) in the corresponding aircraft. In various examples, the method 300 may include determining an average time delay for each of the aircraft based on the congestion factor of the taxi edge to which each of the aircraft are instructed to proceed. The average time delay may be based, at least in part, on the number of aircraft instructed to proceed to the taxi edge and the length of the taxi edge. The average time delay for each of the aircraft may be provided and displayed on the display devices in the corresponding aircraft.

In various examples, the method 300 may include performing various mitigation activities in response to the congestion factors of the taxi edges. In various examples, aircraft taxiing at the airport may be assigned taxi paths based, at least in part, on the congestion factors to disperse the aircraft across the taxiways and reduce overall congestion at the airport. In various examples, the method 300 may include limiting a total number of the aircraft proceeding to a specific taxi edge. In some example, the total number of the aircraft proceeding to the taxi edge may be limited in response to the congestion factor associated therewith exceeding a predetermined capacity threshold. In various examples, a taxiway may be designated as being a dedicated taxiway for moving aircraft from an overly congested taxi edge and thereby relieving congestion thereat. In some examples, the dedicated taxiway may be restricted to one-way traffic while designated as the dedicated taxiway. In this manner, aircraft traffic may be quickly diverted from one taxi edge to another, such as from one end of a runway to an opposite end of the runway. In the example of FIG. 5, the second parallel taxiway 434 may be designated as a dedicated taxiway to reduce congestion at the intersection taxiway 412 and move one or more aircraft 100 to, for example, the intersection taxiway 420. In some examples, a dedicated taxi path may be designated in response to the congestion factor associated therewith exceeding a predetermined congestion threshold. In various examples, the method 300 may include disabling a taxi edge or a taxiway based on the congestion factor of the disabled taxi edge, and directing some or all of the aircraft instructed to proceed to the disabled taxi edge along another taxi edge or taxiway to relieve congestion on the disabled taxi edge. In some examples, a taxi edge may be disabled in response to the congestion factor of the taxi edge exceeding a predetermined disabling threshold.

The systems and methods disclosed herein provide various benefits over certain existing systems and methods. For example, in certain circumstances, it may be challenging to efficiently direct aircraft along the taxiways at an airport. The systems and methods disclosed herein provide for quantifying congestion associated with the taxi edges of an airport to promote awareness of areas of congestion and thereby allow for mitigation thereof. In particular, the systems and methods provide for determining a number of aircraft instructed to proceed to the taxi edges, and generating congestion factors for the taxi edges based, at least in part, on the number of aircraft proceeding to each of the taxi edges. As such the systems and methods effectuate an improvement in the technical field of taxiing aircraft at an airport.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method, comprising:

receiving airport data including runways of an airport, taxi edges of the airport, positions of aircraft at the airport, and taxi paths of aircraft at the airport;

processing, by one or more processors, the airport data to determine a number of aircraft instructed to proceed to a first of the taxi edges;

generating, by the one or more processors, a congestion factor for the first taxi edge based, at least in part, on the number of aircraft proceeding to the first taxi edge; and limiting a number of the aircraft proceeding to the first taxi edge based on the congestion factor associated therewith.

2. The method of claim 1, further comprising:

determining, by the one or more processors, a number of aircraft instructed to proceed to each of the taxi edges;

generating, by the one or more processors, congestion factors for each of the taxi edges based, at least in part, on the number of aircraft proceeding to each of the taxi edges; and continuously updating, by the one or more processors, each of the congestion factors in response to the number of aircraft instructed to proceed to the corresponding the taxi edges changing.

3. The method of claim 2, further comprising:

determining, by the one or more processors, time delays for each of the taxi edges based on the congestion factors corresponding to each of the taxi edges;

determining, by the one or more processors, a cumulative time for a first aircraft based on the time delays of the taxi edges along a taxi path of the first aircraft between a current position of the first aircraft and a runway entry point indicated by the taxi path of the first aircraft; and displaying, by the one or more processors, the cumulative time on a display device of the first aircraft.

4. The method of claim 2, further comprising:

determining, by the one or more processors, time delays for each of the taxi edges based on the congestion factors corresponding to each of the taxi edges;

determining, by the one or more processors, cumulative times for all taxi paths between an apron and a runway based on the time delays of the taxi edges along each of the taxi paths; and displaying, by the one or more processors, the cumulative times on a display device.

5. The method of claim 1, further comprising:

determining, by the one or more processors, an average time delay for a first aircraft instructed to proceed to the first taxi edge based on the congestion factor of the first taxi edge, wherein the average time delay is based, at least in part, on the number of aircraft instructed to proceed to the first taxi edge and a length of the first taxi edge; and displaying, by the one or more processors, the average time delay on a display device of the first aircraft.

6. The method of claim 1, further comprising:

designating a dedicated taxiway based on the congestion factor of the first taxi edge; and directing one or more aircraft along the dedicated taxiway to a second of the taxi edges to relieve congestion on the first taxi edge.

7. The method of claim 6, further comprising:

restricting the dedicated taxiway to one-way traffic while designated as the dedicated taxiway.

8. The method of claim 1, further comprising:

disabling the first taxi edge based on the congestion factor of the first taxi edge; and directing at least one of the aircraft instructed to proceed to the first taxi edge to a second of the taxi edges to relieve congestion on the first taxi edge.

9. The method of claim 1, wherein generating the congestion factor is performed using an A* algorithm.

10. A system, comprising:

a database comprising airport data indicating runways of an airport and taxi edges of the airport, positions of aircraft at the airport, and taxi paths of aircraft at the airport; and one or more controllers in operable communication with the database and the one or more controllers coupled to receive the airport data and configured to, by one or more processors:

process the airport data to determine a number of aircraft instructed to proceed to a first of the taxi edges;

generate a congestion factor for the first taxi edge based, at least in part, on the number of aircraft proceeding to the first taxi edge; and designate a dedicated taxiway based on the congestion factor of the first taxi edge; and direct one or more aircraft along the dedicated taxiway to a second of the taxi edges to relieve congestion on the first taxi edge.

11. The system of claim 10, wherein the one or more controllers are configured to, by the one or more processors:

determine a number of aircraft instructed to proceed to each of the taxi edges;

generate congestion factors for each of the taxi edges based, at least in part, on the number of aircraft proceeding to each of the taxi edges; and continuously update each of the congestion factors in response to the number of aircraft instructed to proceed to the corresponding the taxi edges changing.

12. The system of claim 11, wherein the one or more controllers are configured to, by the one or more processors:

determine time delays for each of the taxi edges based on the congestion factors corresponding to each of the taxi edges;

determine a cumulative time for a first aircraft based on the time delays of the taxi edges along a taxi path of the first aircraft between a current position of the first aircraft and a runway entry point indicated by the taxi path of the first aircraft; and display the cumulative time on a display device of the first aircraft.

13. The system of claim 11, wherein the one or more controllers are configured to, by the one or more processors:

determine time delays for each of the taxi edges based on the congestion factors corresponding to each of the taxi edges;

determine cumulative times for all taxi paths between an apron and a runway based on the time delays of the taxi edges along each of the taxi paths; and display the cumulative times on a display device.

14. The system of claim 10, wherein the one or more controllers are configured to, by the one or more processors:

limit a number of the aircraft proceeding to the first taxi edge based on the congestion factor associated therewith.

15. The system of claim 10, wherein the one or more controllers are configured to, by the one or more processors:

determine an average time delay for a first aircraft instructed to proceed to the first taxi edge based on the congestion factor of the first taxi edge, wherein the average time delay is based, at least in part, on the number of aircraft instructed to proceed to the first taxi edge and a length of the first taxi edge; and display the average time delay on a display device of the first aircraft.

16. The system of claim 10, wherein the one or more controllers are configured to, by the one or more processors:

restrict the dedicated taxiway to one-way traffic while designated as the dedicated taxiway.

17. The system of claim 10, wherein the one or more controllers are configured to, by the one or more processors, generate the congestion factor using an A* algorithm.

18. A system, comprising:

a database comprising airport data indicating runways of an airport and taxi edges of the airport, positions of aircraft at the airport, and taxi paths of aircraft at the airport; and one or more controllers in operable communication with the database and the one or more controllers coupled to receive the airport data and configured to, by one or more processors:

process the airport data to determine a number of aircraft instructed to proceed to a first of the taxi edges;

generate a congestion factor for the first taxi edge based, at least in part, on the number of aircraft proceeding to the first taxi edge;

disable the first taxi edge based on the congestion factor of the first taxi edge; and direct at least one of the aircraft instructed to proceed to the first taxi edge to a second of the taxi edges to relieve congestion on the first taxi edge.

19. The system of claim 18, wherein the one or more controllers are configured to, by the one or more processors:

determine a number of aircraft instructed to proceed to each of the taxi edges;

generate congestion factors for each of the taxi edges based, at least in part, on the number of aircraft proceeding to each of the taxi edges;

continuously update each of the congestion factors in response to the number of aircraft instructed to proceed to the corresponding the taxi edges changing;

determine time delays for each of the taxi edges based on the congestion factors corresponding to each of the taxi edges;

determine a cumulative time for a first aircraft based on the time delays of the taxi edges along a taxi path of the first aircraft between a current position of the first aircraft and a runway entry point indicated by the taxi path of the first aircraft; and display the cumulative time on a display device of the first aircraft.

20. The system of claim 18, wherein the one or more controllers are configured to, by the one or more processors:

determine an average time delay for a first aircraft instructed to proceed to the first taxi edge based on the congestion factor of the first taxi edge, wherein the average time delay is based, at least in part, on the number of aircraft instructed to proceed to the first taxi edge and a length of the first taxi edge; and display the average time delay on a display device of the first aircraft.

* * * * *